(12) United States Patent
Cachon et al.

(10) Patent No.: US 8,276,621 B2
(45) Date of Patent: Oct. 2, 2012

(54) ELEMENT FOR A PIPE FOR TRANSPORTING HOT GASES AND METHOD OF FABRICATING SAID ELEMENT

(75) Inventors: Lionel Cachon, Manosque (FR); Franck Dechelette, Aix en Provence (FR); Fabrice Delassalle, Jouques (FR)

(73) Assignee: Commissariat a l'Energie Atomique (FR)

( * ) Notice: Subject to any disclaimer, the term of this patent is extended or adjusted under 35 U.S.C. 154(b) by 1037 days.

(21) Appl. No.: 12/095,987

(22) PCT Filed: Nov. 30, 2006

(86) PCT No.: PCT/EP2006/069089
§ 371 (c)(1),
(2), (4) Date: Jun. 3, 2008

(87) PCT Pub. No.: WO2007/065835
PCT Pub. Date: Jun. 14, 2007

(65) Prior Publication Data
US 2009/0133772 A1   May 28, 2009

(30) Foreign Application Priority Data
Dec. 5, 2005   (FR) ..................................... 05 53723

(51) Int. Cl.
*F16L 9/14* (2006.01)
(52) U.S. Cl. ...... 138/149; 138/148; 138/155; 285/123.5
(58) Field of Classification Search .................. 138/149, 138/148, 155; 285/123.5, 123.1
See application file for complete search history.

(56) References Cited

U.S. PATENT DOCUMENTS

| | | | | |
|---|---|---|---|---|
| 1,160,202 | A | * | 11/1915 | Scherer ................... 285/123.16 |
| 2,419,278 | A | | 4/1947 | Motsenbocker, Jr. ......... 138/109 |
| 3,850,453 | A | * | 11/1974 | Bentley et al. .................. 285/47 |
| 3,885,595 | A | * | 5/1975 | Gibson et al. ................. 138/155 |
| 4,221,239 | A | * | 9/1980 | Reale ............................ 138/149 |
| 4,259,993 | A | | 4/1981 | Scholz .......................... 138/149 |
| 4,538,834 | A | * | 9/1985 | Brady et al. .................... 285/10 |
| 4,582,094 | A | | 4/1986 | Stausebach ................... 138/147 |
| 5,183,299 | A | * | 2/1993 | Hallerstrom et al. ........... 285/47 |
| 5,697,215 | A | | 12/1997 | Canevet et al. ................... 60/99 |

(Continued)

FOREIGN PATENT DOCUMENTS
DE   3336465   4/1985
(Continued)

OTHER PUBLICATIONS

English translation of Intl. Preliminary Exam. Report.

*Primary Examiner* — Patrick F Brinson
(74) *Attorney, Agent, or Firm* — Baker & Hostetler LLP

(57) ABSTRACT

The present invention principally relates to a thermal insulation element (200) of cylindrical shape for a fluid transport pipe comprising an envelope (204) of longitudinal axis (X), a thermal insulation arranged in said envelope (204), the envelope (204) comprising a deformable annular zone, comprising a first (212.6) and a second (212.12) cylindrical surface that overlap and are able to slide against each other in the case of movement imposed by thermal loads applied to said pipe insulation element (200).

The present invention also relates to a method of fabricating pipes for transporting fluids at high temperature, particularly hot gases, from elements according to the present invention by fitting a male connector of one element into a female connector of the other element.

17 Claims, 7 Drawing Sheets

U.S. PATENT DOCUMENTS

2005/0135542 A1 6/2005 Stellwag et al.

FOREIGN PATENT DOCUMENTS

| | | |
|---|---|---|
| DE | 3720714 | 5/1989 |
| DE | 41 07 539 A1 | 3/1991 |
| DE | 4107539 | 10/1992 |
| DE | 44 31 954 C1 | 9/1994 |
| DE | 4431954 | 11/1995 |
| EP | 0000497 | 2/1979 |
| GB | 2159598 | 12/1985 |
| JP | 54-62556 | 5/1979 |
| JP | 54095059 | 7/1979 |
| JP | 55-20935 | 2/1980 |
| JP | 2000-097389 | 4/2000 |
| JP | 2005-504265 | 2/2005 |
| NL | 56141 | 4/1944 |
| WO | 02/93586 | 5/2002 |

\* cited by examiner

ELEMENT FOR A PIPE FOR TRANSPORTING HOT GASES AND METHOD OF FABRICATING SAID ELEMENT

TECHNICAL FIELD

The present invention relates to the transport, particularly of hot gases used for example as heat transfer fluid.

The present invention applies to the field of thermal protection of metal structures used in numerous sectors (aeronautics, chemical engineering, nuclear, etc.). Such thermal protection is used in nuclear reactors developed within the scope of new designs of reactors, known as fourth generation reactors.

More particularly, the device according to the invention is designed for installations operating in the high temperature domain, in other words for HTR reactors (High Temperature Reactors) in which the temperature of the coolant at the reactor outlet is above 800° C.; preferably, it involves gas cooled reactors (GCR) operating with a rapid neutron flux cooled by a gas.

STATE OF THE PRIOR ART

Numerous methods produce (chemical engineering in particular) or use as heat transfer fluid (nuclear reactors in particular) gases under pressure at high temperature.

The temperature of the gas can reach 1000° C., at a pressure of 100 bars.

The confinement and the transport of a gas under pressure at high temperature in pipes are likely to generate unacceptable stresses in the pipes.

Indeed, at the present time, none of the materials listed in the dimensioning codes is provided to operate in a reliable manner at such a load level (in other words such a pressure combined with this level of temperature). Consequently, it would appear necessary to lower the temperature of the pipe structure, correlatively with the pressure level, so to come within the acceptable dimensioning conditions defined by the dimensioning codes.

Provision is therefore made, in a conventional manner, for using a thermal protection device capable of absorbing a thermal gradient greater than 800° C. over its thickness in order to maintain the structure at acceptable temperature. The technical solutions enabling this problem to be solved may be classed into two major families:

the first consists in an active cooling of the external structure of the pipe by a fluid. This technique is efficient. However, it has two drawbacks. Firstly, it makes use of a cumbersome and costly solution requiring an auxiliary cooling installation to be mounted and, secondly, the installation of such a device leads to a significant cooling of the gas to be conveyed.

However, in the case where it is desired to recover the heat of the transported fluid to produce energy, as is the case in an electric power plant for example, this cooling is very penalising.

The second technique consists in mounting a thermal insulation between the hot gas and the structure. This insulation forming a thermal barrier is not leak tight and it is its ability to render the gas immobile in its thickness that assures its efficiency.

This technique is very efficient and may be implemented in different ways.

Essentially three different types of heat insulation exist:

metal heat insulation: a stack formed of a succession of thin metal sheets spaced at a distance capable of avoiding convection phenomena is used as anti-radiation protection.

As protection against convective phenomena, stratified structures composed of layers of fine mesh metal screens with a 0.2 mm wire and thin metal sheets (type Metallisol®) exist. To attain good insulation performance, this type of thermal barrier must be of large size and is therefore bulky. Its bulk restricts its use to large size components.

Solid, self-structuring ceramic insulations inside the pipe, enabling the external metal surface to be protected from the temperature of the gas, with notably the action of natural convection. This type of thermal insulation is disclosed in document EP 0000497. It is commonly used in applications such as furnaces, however it does not have a good resistance faced with the pressure or temperature gradients that could be encountered in the solid insulation. A rapid ageing through fissuring of the insulation is therefore likely in gas cooled reactor (GCR) type applications, where problems linked to vibrations or rapid depressurisations of the pipe can occur. Furthermore, most of these solid and porous ceramics do not withstand high velocity (>20 m/s) erosion. They require a vitrification treatment of the face in contact with the circulating gas, which renders this same face more fragile to the thermal gradients.

Fibrous insulations placed inside the pipe. Since this insulation has no mechanical strength, it is generally contained in a structure, of jacket type for pipes, which should protect it from the circulation of the fluid.

For an application in GCR, fibrous insulations appear to be the most efficient.

As stated previously, the fibrous insulations are enclosed between the jacket and the structure to isolate them from the gases. A mechanical liaison needs to be provided in order to link the jacket and the structure.

Technical solutions are then required for jackets linked to the structure, capable of withstanding the differential expansions between the hot internal jacket and the external pipe that remains at a moderate temperature, and to enable the internal jacket at the temperature of the gas to withstand rapid pressure variations.

Two zones are particularly sensitive to the above mentioned stresses:

the transition zone between two pipe elements, the link between the jacket and the pipe.

These transition zones enable the differential expansion of the structures to be compensated.

Document DE 37 20 714 describes the use of an added on part forming the interface between two pipe elements, the end of the elements having a stepped section enabling a fitting of one end of one element in one end of another element. This document also describes a fitting by conical shaped means.

Documents NL56141 and GB 2 159 598, also describe interfaces of conical shape.

The elements described above are formed by a rigid envelope. Thus, in the case of a thermal insulation intended to absorb a thermal gradient of around 800° C., it has a too high thermal stress, as well as large deformations transferred onto the internal jacket guiding the fluid. The jacket is then subjected to very considerable stresses, likely to damage it.

Document U.S. Pat. No. 2,419,278 proposes the use of annular bellows diaphragms connecting the longitudinal ends of the internal jacket and the outer envelope. These bellows diaphragms are intended to absorb the expansions that can occur, particularly between the jacket and the outer envelope. Firstly, the fabrication of such an element is relatively complex. Secondly, the interface between two elements of pipe is difficult to form.

Document DE 33 36 465 proposes integrating in the pipe deformable elements, these elements have a "V" shape welded between the external pipe and the internal jacket. Moreover, axial bellows diaphragms are also provided for in the jacket. The expansion difference between the inner and the outer is compensated by these adapted shapes. In order not to disrupt the flow too much, a second jacket is placed in direct contact with the gas. This solution, apart from its complexity, has the principal drawback of being difficult to implement. The fibres contained in the pipe elements thereby formed are in part exposed at the level of the connection zones between the elements, before the assembly of the elements and the bellows diaphragms. The fibres can therefore come out of their housing and be a hindrance during assembly.

Document U.S. Pat. No. 5,697,215 also discloses thermal insulation tubes arranged inside exhaust gas pipes. These insulating tubes comprise an external tube, an internal tube and a low density material between the internal and external tubes. The internal and external tubes are connected to each other by flexible rings to seal the annular space between the internal and external tubes. A rigid ring covers each flexible ring to assure the centring of the internal tube in relation to the external tube. The external tube comes into contact with the exhaust gas pipe and the assembly is therefore complex to fabricate.

Document U.S. Pat. No. 3,885,595 describes a cryogenic liquid transport pipe, formed by an internal tube and an external tube, between which is arranged a thermal insulation. A male connector and a female connector are each provided for at one end. A thermal expansion bellows diaphragm is provided for at the level of the female connector. However, this pipe does not enable the transport of gas, since the joints provided for between the male and female ends allow gas leaks.

Document DE 41 07 539 describes a pipe for exhaust pipe comprising an internal tube and an external tube, between which is arranged a thermal insulation. The internal and external tubes are in contact via their ends and can slide against each other in the case of thermal expansion. However, fabricating long length pipe is not easy, since assembling several pipe modules is not provided for, no means of connection between the pipe modules being provided for.

The aim of the present invention is therefore to offer a pipe element for the transport of hot fluids comprising a thermal insulation structure enabling an easy assembly of at least two elements and completely enveloping the fibre, absorbing the differential expansions between the hottest part (the jacket) and the cold part (the structure of the pipe) with a thermal gradient over the thickness of the thermal insulation that can reach 800° C. and withstanding a rapid depressurisation (up to 20 bar/s).

A further aim of the present invention is to offer a pipe for the transport of fluid at high temperature of simple and reliable assembly.

DESCRIPTION OF THE INVENTION

The above mentioned aims are attained by a thermal insulation cartridge containing the thermal insulation material constituted of two sliding parts enabling the thermal accommodation without stress or deformation of the jacket guiding the gas.

The envelope of the cartridge is not sealed in a rigid manner, to enable a moving apart and/or a moving closer of two parts of the cartridge, which permanently overlap so as to encapsulate the thermal insulation and to isolate the gases, without imposing stress on all of the cartridge.

In other words, the thermal insulation element comprises an axial buffer zone, formed of two surfaces in contact, which absorbs the deformations due to the thermal expansion and the shocks generated by the abrupt variation in the pressure of the transported fluid.

Furthermore, the thermal element comprises at a first end a male connector and at a second end a female connector. The assembly of a pipe takes place by penetration of a male connector into a female connector. Apart from the ease of assembly, this assembly by sliding between the connectors makes it possible to accommodate the play due to the thermal expansions and the mechanical stresses between the elements themselves.

Thus, according to the present invention, the thermal element comprises a first internal thermal and mechanical accommodation means and a second thermal and mechanical accommodation means between the elements. This combination is particularly advantageous.

The present invention is particularly suited to straight pipes.

According to one aspect of the invention, it is provided that the insulation element forms an integral part of the pipe, which enables a simple assembly of a network of straight high temperature pipes without having to take account of the thermal protection during the assembly.

The main object of the present invention is therefore a thermal insulation element for a pipe for transporting gas at high temperature comprising an envelope of longitudinal axis, at least one fibrous type thermal insulation arranged in said envelope, said thermal insulation being encapsulated in the envelope, the envelope being formed by an outer envelope of the fluid transport pipe and a jacket intended to be in contact with the fluid to be transported and comprising at a first longitudinal end a male connector and at a second longitudinal end opposite to the first longitudinal end a female connector, the outer envelope and the jacket being connected by male and female connectors, said envelope comprising an axially adaptable annular zone, said adaptable zone being situated at the level of the female connector, said adaptable zone comprising a first and a second cylindrical surface that overlap and are able to slide against each other in the case of expansions of said pipe insulation element.

In the present patent application, adaptable zone is taken to mean a zone in which the dimensions can be modified to compensate a thermal expansion and/or a mechanical deformation due to an expansion, and therefore capable of adapting its dimensions to the operating conditions so as to avoid a bursting of the pipe.

The fabrication of a pipe is thereby simplified by penetration of male connectors of first elements into female connectors of second elements, said surfaces capable of sliding against each other being formed in the female connector. This advantageous configuration reduces the thermal bridges present at the connection of the segments.

Thus the envelope in which the thermal insulation is confined is not sealed, but its configuration makes it possible to contain the fibres and to isolate it from the gases, while at the same time facilitating the adaptation of said envelope to the thermal stresses and mechanical stresses due to abrupt pressure variations.

In a preferred embodiment, the male connector comprises a first and a second annular flange connected by a tubular portion, said first and second flanges being fixed respectively to a first longitudinal end of the jacket through the intermediary of the tubular portion to a first longitudinal end of the outer envelope, and the first and second cylindrical surfaces of the female connector forming respectively part of a first part and of a second part, said first part being fixed to the jacket and said second part being fixed to the outer envelope.

In particular, the first part comprises an annular flange connected by its inner diameter to the jacket at the level of a second longitudinal end of said jacket and to a first tubular portion by its outer diameter, said first tubular portion forming the first surface, in which the second part comprises an annular flange connected by its outer diameter to a second longitudinal end of the outer envelope and to a second tubular portion by its inner diameter, said second tubular portion forming the second surface, said first and second parts being assembled so that the first and second tubular portions overlap each other at least partially and can slide against each other.

The second tubular portion of the second part of the female connector can penetrate into the first tubular portion of the first part of the female connector The flange of the first part of the female connector is, for example, fixed to the peripheral wall of the jacket behind the second longitudinal end of the jacket.

The first longitudinal end of the jacket may also have a splayed shape in order to avoid a mechanical uncoupling for the overlapping zone.

Advantageously, the flanges comprise a conic shape oriented from the second longitudinal end towards the first longitudinal end of the jacket.

The male connector may be fixed by welding on the outer envelope and on the jacket, and the first and second parts of the female connector can be fixed by welding on the jacket and on the outer envelope respectively.

The male and female connectors are advantageously coated at least partially by a coating capable of reducing friction and wear between the male connector and the female connector, of the cermet $Cr_3C_2$—NiCr, or yttrium stabilised zirconia type.

The material used to fabricate the internal structure (jacket and liaisons) of the thermal insulation elements according to the present invention, is for example a HR230 or Inconel 600 type nickel alloy.

The thermal insulation arranged between the jacket and the outer envelope has advantageously a thermal conductivity less than 0.3 w/m/° C.

This thermal insulation may comprise an alkaline earth silicate felt and/or wool, and/or a graphite felt and at least one screen.

Advantageously, the thermal insulation comprises first tubes of larger mesh size screen and a second tube of smaller mesh size screen; these first tubes may be fixed. Their axial movement is limited by the male and female connectors.

The first tubes have, for example, meshes of 10 mm sides formed with a wire of 2 mm diameter and the second tube has meshes of 0.5 mm sides formed with a wire of 0.3 mm diameter.

The present invention further relates to a fluid transport pipe to form pipe circuits that make it possible to assure the passage of a gas at high temperature and at pressure, comprising a succession of thermal insulation elements according to the present invention.

The assembly of these thermal insulation elements according to the present invention comprises means of fixation to another thermal insulation element according to the present invention, by flanging or by welding.

The present invention further relates to a method of fabricating a pipe element according to the present invention, comprising the steps:

a) fabricating a first sub-assembly comprising the jacket, the male connector and the first part of the female connector and fabricating the second part of the female connector, b) mounting place screened tubes around the jacket, c) fixing said first sub-assembly on the outer envelope, d) mounting a thermal insulation material between the jacket and the outer envelope, e) fixing the second part of the female connector on the outer envelope.

During step a), the fabrication of the sub-assembly and the second part of the female connector by forming and welding may be provided for.

The present invention further relates to a method of fabricating a pipe by means of pipe elements according to the present invention, comprising:

f) the step of inserting a male connector of an element into a female connector of another element, g) securing the two elements by flanging or welding, h) repeating steps f), g) until the desired length of pipe is attained.

BRIEF DESCRIPTION OF DRAWINGS

The characteristics and advantages of the invention will be better understood on reading the description that follows and by referring to the appended figures, given solely by way of indication and in no way limiting.

DETAILED DESCRIPTION OF SPECIFIC EMBODIMENTS

Figure 1:
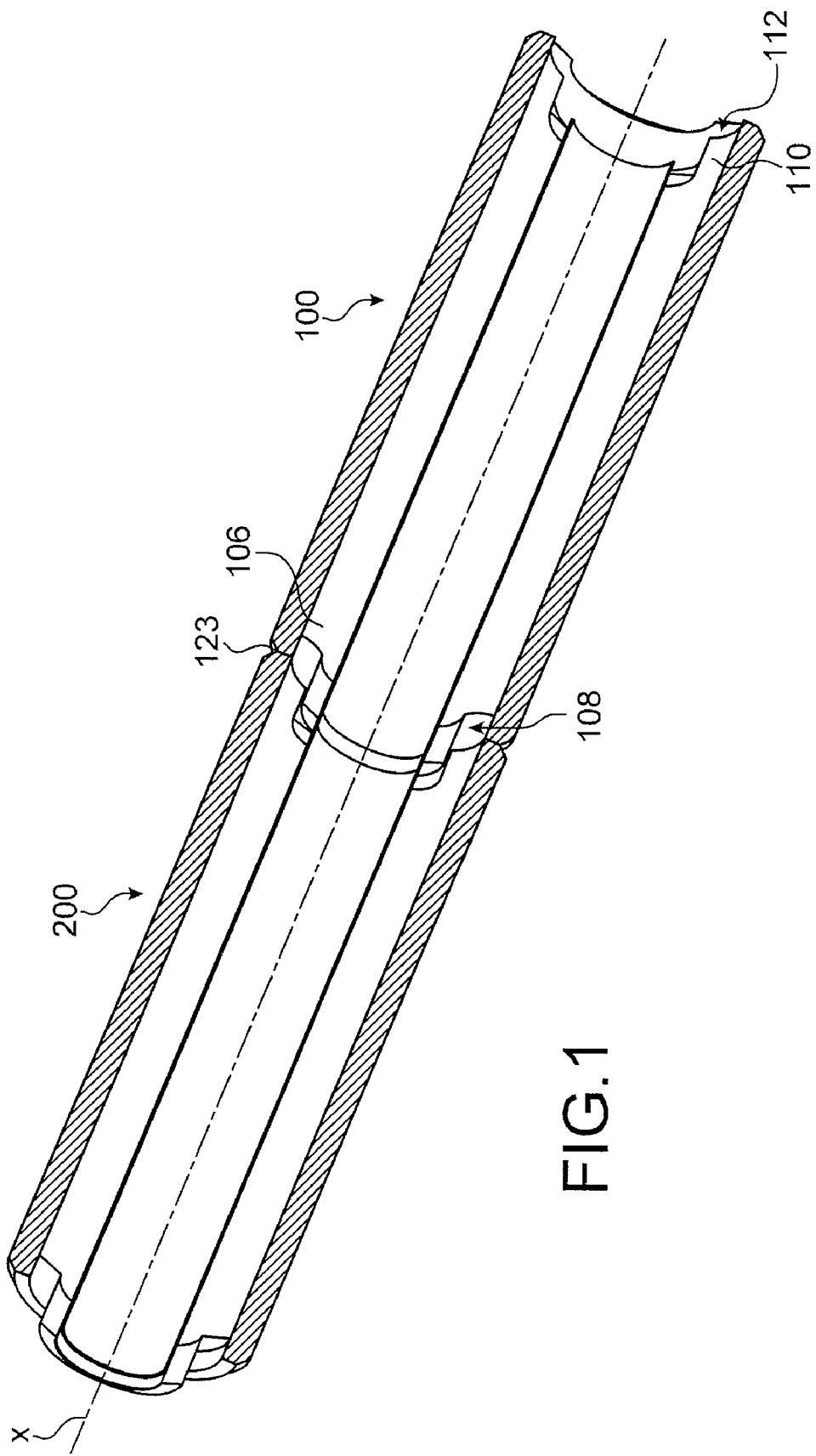
FIG. 1 is a longitudinal sectional view of a pipe according to one example of the present invention.
Figure 2A:
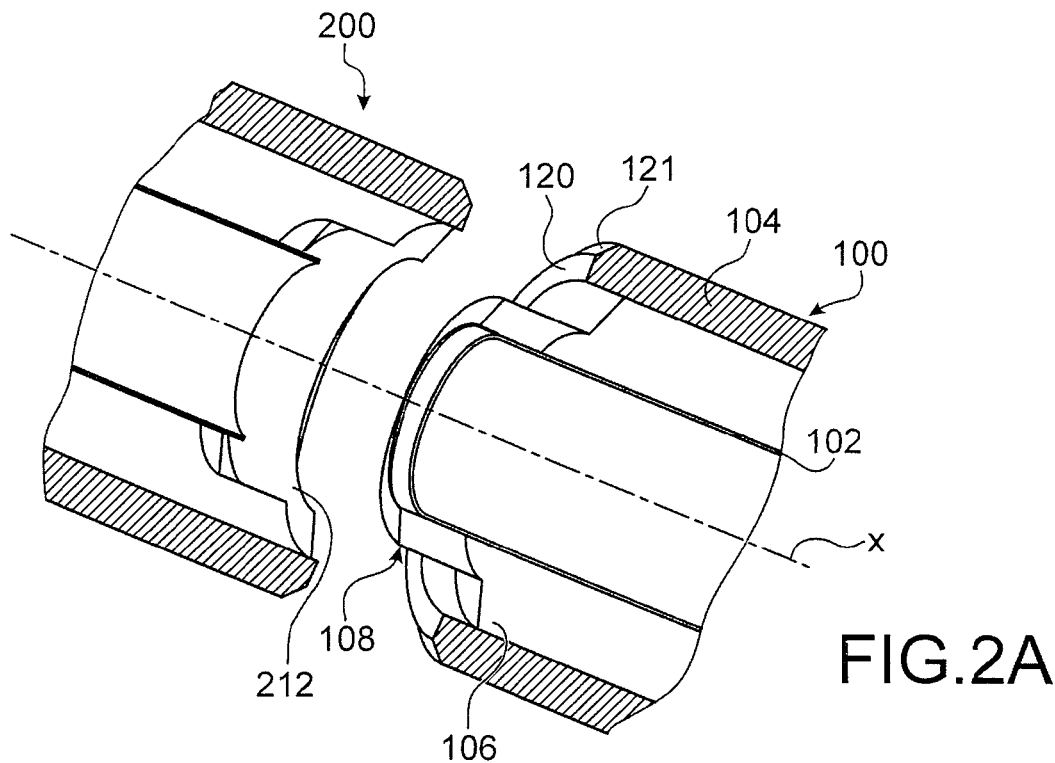
FIG. 2A is a detailed view of two thermal insulation elements to form a pipe according to another example.
Figure 2B:
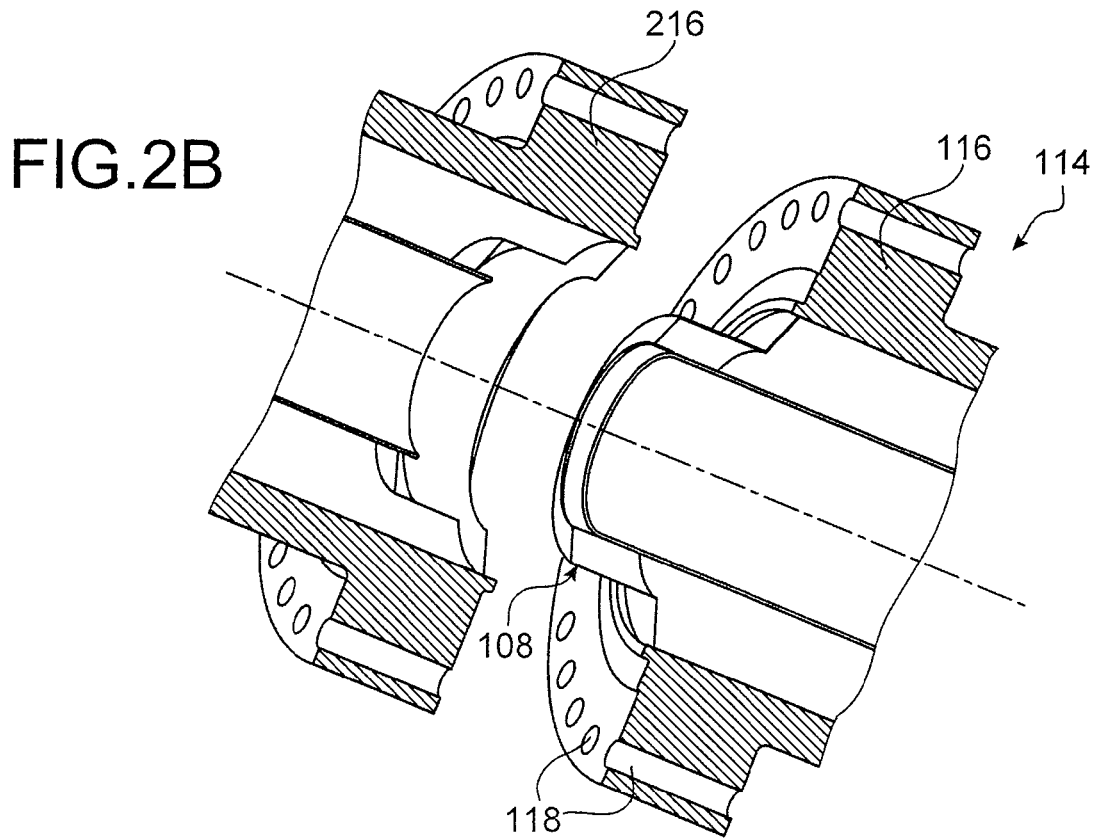
FIG. 2B is a view of two thermal insulation elements according to the present invention to form the pipe of FIG. 1, FIGS. 3A and 3B are sectional views of a male connector of an insulation element according to the present invention.

In FIGS. 1, 2A and 2B may be seen a part of a fluid transport pipe according to the present invention comprising a first 100 and a second 200 thermal insulation element according to the present invention.

The following description relates more particularly to a thermal insulation element fabricated from a single piece with the pipe, in other words that the outer tube of the pipe forms the outer envelope of the insulation element, and the jacket intended to be in contact with the fluid to be transported forms the inner envelope of the thermal insulation element. Thus the thermal insulation element and the pipe element are, in this case, the same.

However, a thermal insulation element formed in a separate manner compared to the outer envelope of the pipe and to the jacket does not fall outside the scope of the present invention. This element will then be added into the pipe and fixed to it.

Since elements 100, 200 are identical, element 100 will be described in particular. The element 100 comprises an inner envelope or jacket 102 of cylindrical shape of X axis revolution, intended to be in contact with the fluid to be transported and an outer envelope 104 or external pipe also of coaxial revolution to the jacket 102, intended to be in contact with the outer environment.

The elements advantageously have a symmetry of revolution around the X axis.

In a preferred embodiment, the thermal insulation element comprises at a first longitudinal end 106 a male connector 108 and at a second longitudinal end 110 a female connector 112.

The male connector 108 is capable of penetrating into a female connector 212 of the element 200, so as to form a portion of pipe.

The jacket 102, the outer envelope 104, and the male 108 and female 112 connectors delimit a space to contain a thermal insulation, for example of fibrous type. This space makes it possible to encapsulate the thermal insulation so as to assure it is held in place and to isolate it from the environment, particularly hot gases, to prevent its deterioration.

The element 100 further comprises means of securing 114 to an element upstream and to an element downstream in the direction of the arrow F.

In FIG. 2A may be seen an example of fixing two pipe elements according to the invention, in which the securing is achieved by welding.

The longitudinal ends of the outer envelope comprise an annular surface 120, substantially orthogonal to the X axis surrounded by an outer chamfer 121. Thus, when a first end 106 of a first element 100 is brought into contact with a second end 210 of a second element 200, a groove 123 of substantially triangular section is delimited to receive the weld bead.

In FIG. 2B may be seen another example of these securing means 114. The means 114 are formed by flanges 116 projecting from the first and second longitudinal ends of the outer envelope 104.

The flanges 116 comprise borings 118 spread out regularly all around the X axis. The borings 118 borne by a flange 116 of an element 100 lie opposite a boring of a flange 216 of another element 200 while the two elements 100, 200 are brought together to enable a flanging means, for example a bolt (not represented) to pass through the two borings and to maintain the two flanges against each other by cooperation with a nut.

The male 108 and female 112 connectors of an element according to the present invention will now be described in detail.

Figure 3A:
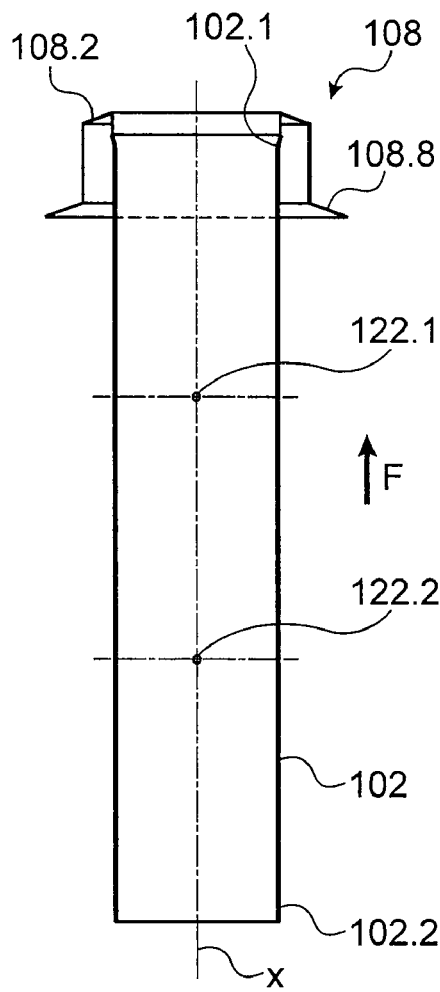
Figure 3B:
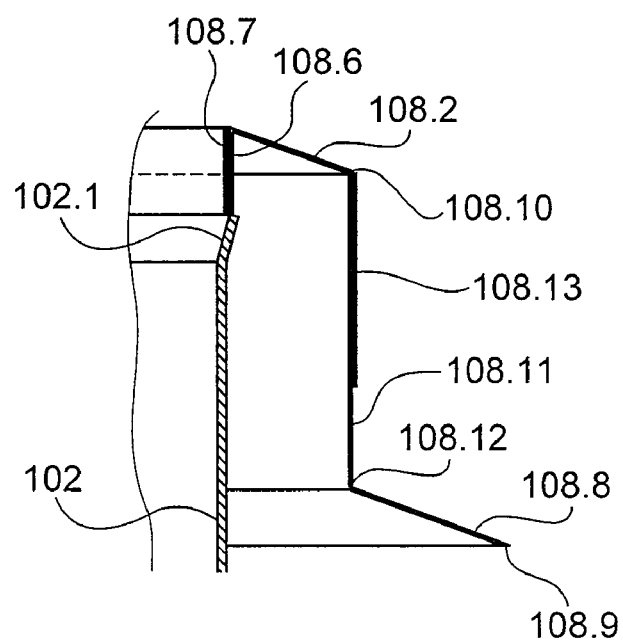

In FIGS. 3A and 3B may be seen a schematic representation of a male connector 108.

The male connector 108 comprises a first annular flange 108.2 coaxial to the jacket 102 and connected to a first longitudinal end 102.1 of the jacket 102.

Advantageously, a tube 108.6 connects the first flange 108.2 and the first longitudinal end 102.1 of the jacket 102 by end to end welding. Fixing the first flange 108 directly on the jacket 102 may also be envisaged.

The male connector 108 further comprises a second flange 108.8 arranged upstream of the first flange 108.2 and surrounding the jacket 102. The second flange 108.8 is connected to an outer diameter 108.10 of the first flange 108.2 by its inner diameter 108.12. The two flanges are connected by a tubular portion 108.11 coaxial to the jacket 102.

The second flange 108.8 is connected by its outer diameter 108.9 to the outer envelope 104. The male connector 108 connects the outer envelope 104 and the jacket 102 and seals the first end 106 of the element 100, confining the thermal insulation material.

Advantageously, the annular flanges 108.2, 108.8 are conic of conic shape oriented along the arrow F from the second 102.2 towards the first 102.1 longitudinal end of the jacket 102.

Also in an advantageous manner, the first end 102.1 of the jacket 102 is splayed for example by drawing, preventing a mechanical uncoupling for the overlap zone with the female connector 112.

The female connector 112 will now be described on the basis of FIGS. 4A, 4B and 5.

Figure 4A:
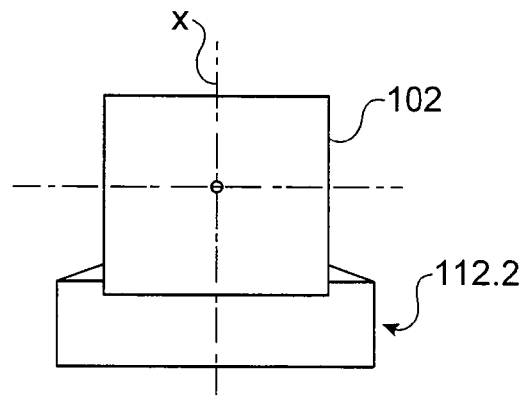
FIGS. 4A, 4B and 5 are sectional views of a female connector borne by an element according to the present invention.
Figure 4B:
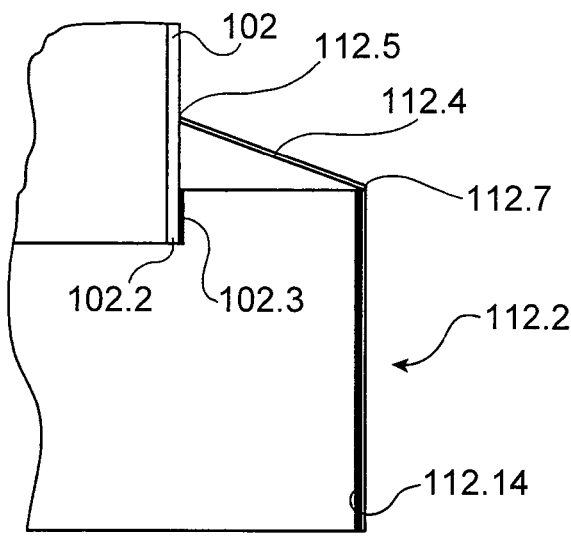
Figure 5:
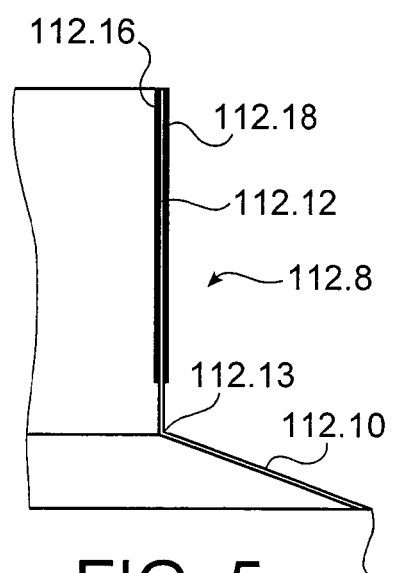

The female connector 112 comprises a first part 112.2 fixed to the jacket 102 at the level of its second longitudinal end 102.2 (FIGS. 4A and 4B).

This first part 112.2 comprises an annular flange 112.4 of inner diameter substantially equal to the outer diameter of the jacket 102 and fixed to the jacket 102 by its inner diameter 112.5, for example by welding. The first part 112.2 further comprises a tubular portion 112.6 of axis X, extending from an outer diameter 112.7 of the flange 112.4.

The female connector 112 further comprises a second part 112.8 (FIG. 5) comprising a flange 112.10 of outer diameter substantially equal to the inner diameter of the outer envelope 104 and fixed to it by its outer diameter 112.11, for example by welding.

The second part 112.8 further comprises a tubular portion 112.12 extending from the flange 112.10 from its inner diameter 112.13.

The outer diameter of the tubular portion 112.12 of the second part 112.8 is less than the inner diameter of the first tubular portion 112.6 of the first part 112.2, so as to enable the penetration of the second part 112.8 into the first part 112.2. The inner and outer diameters of the second 112.12 and first 112.6 tubular portions respectively are such that a functional play is assured between the tubular portions 112.6, 112.12, to enable a sliding between the tubular portions 112.6, 112.12 while at the same time assuring a confinement of a thermal insulation material.

Thus, advantageously, it is at the level of the female connector 112 that the movements caused by the differential expansions take place within an element. Furthermore, the assembly of the elements by penetration of a male connector into a female connector enables the expansion between the elements to be withstood.

Figure 6:
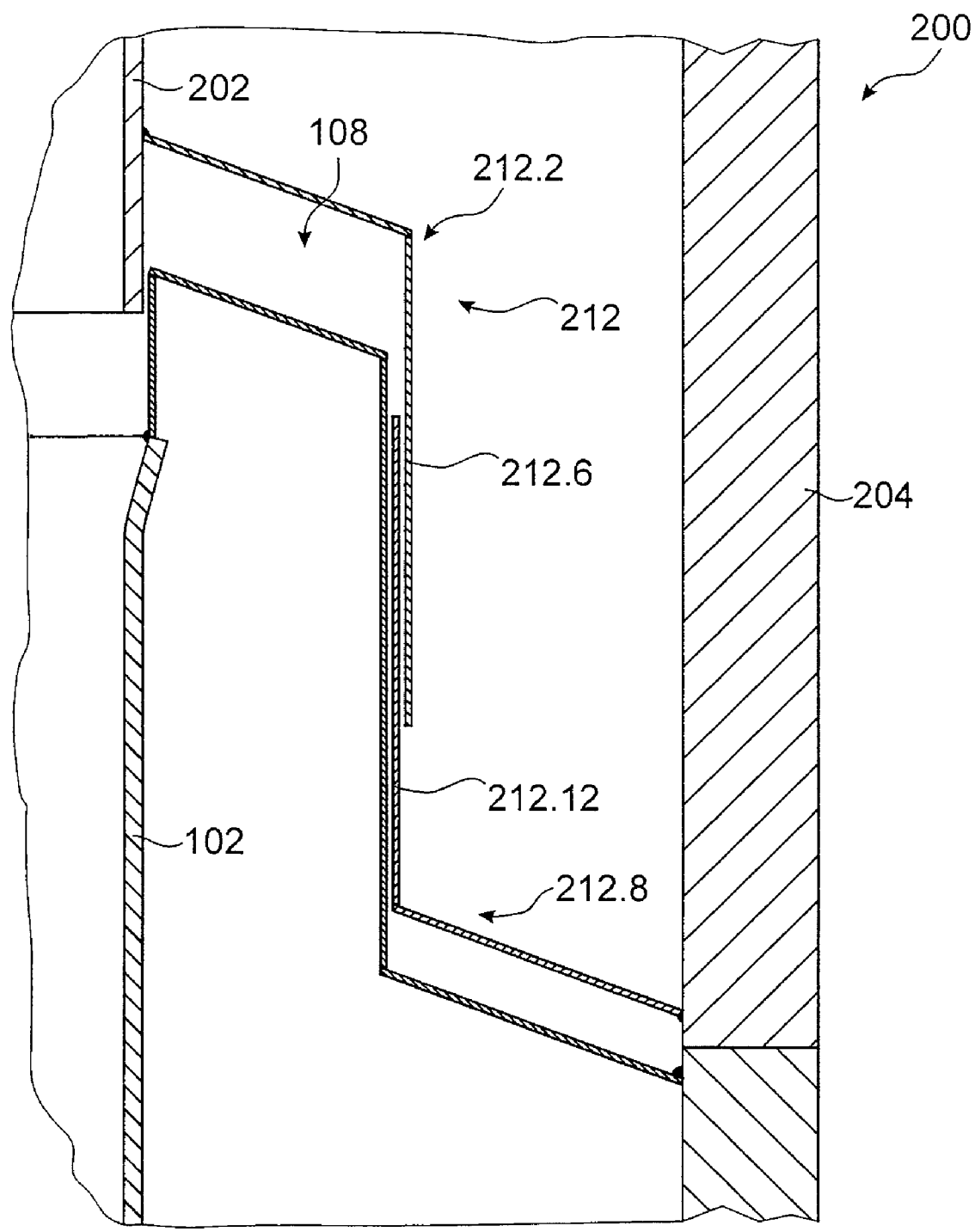
FIG. 6 is an enlarged view of FIG. 1.
Figure 7:
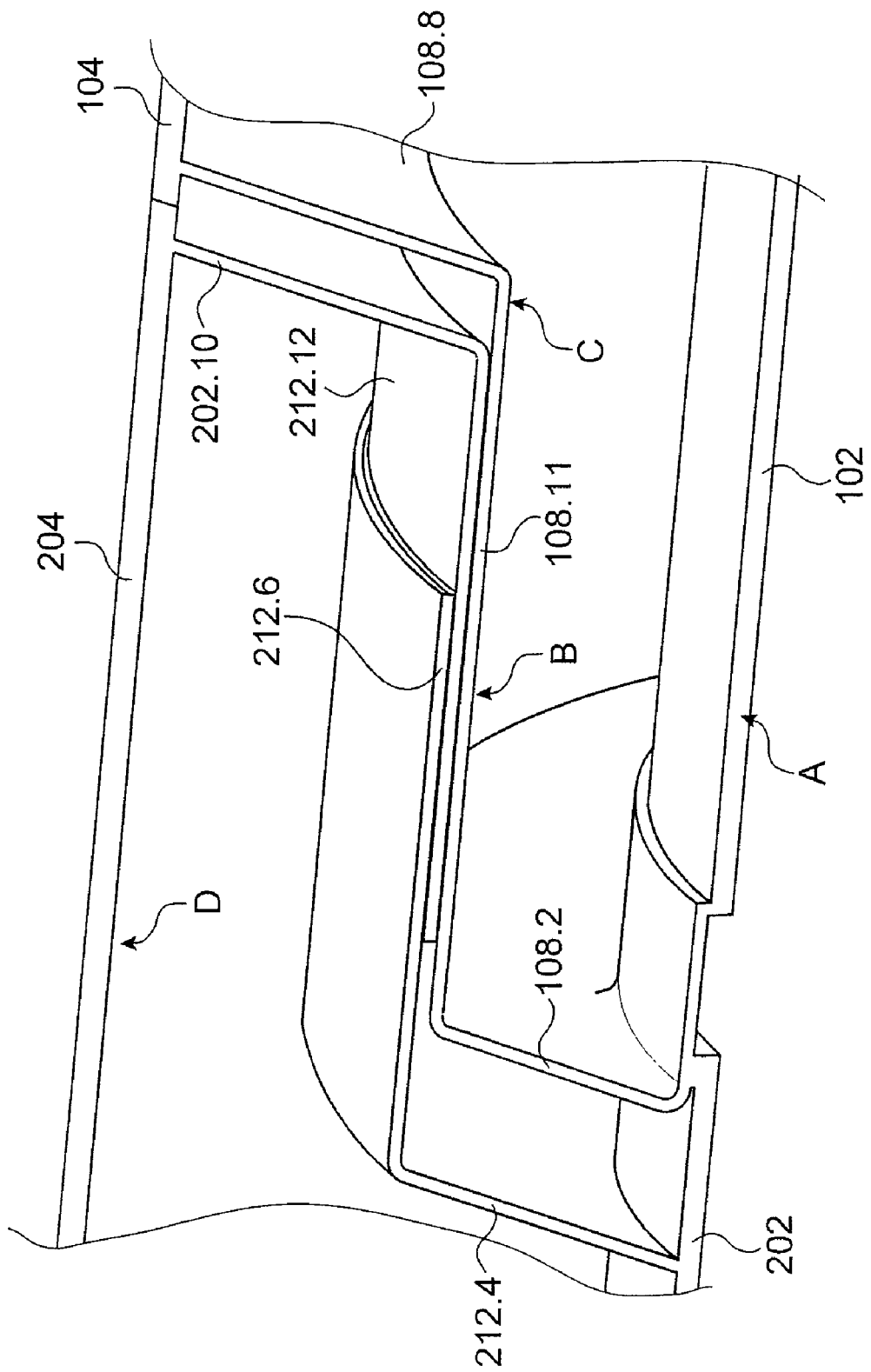
FIG. 7 represents the results of the thermal simulation performed on a pipe according to the present invention.

Thus, it is the second part 112.8, as may be seen in FIGS. 6 and 7, that penetrates into the first part 112.2 of the female connector 112.

The fixing of the different parts of the female connector on the jacket 102 and the outer envelope 104 is achieved for example by welding.

Each of the elements forming the male 108 and female 112 connectors as well as the jacket 102 is, for example formed in nickel alloy, for example HR230 or Inconel 600®, and fixed together by welding.

The elements may have a length extending up to 3 m without constraint on the passage diameter of the fluid.

Advantageously, the surfaces in contact between the male connector 108 and the female connector 112 are coated with a material limiting friction and wear.

In FIGS. 3A to 5, the coated surfaces are represented as thick lines.

They involve in particular the outer peripheral surface 102.3 at the level of the second longitudinal end 102.2 of the jacket 102, of the inner surface 108.7 of the tubular portion 108.6 of the male connector 108, these two surfaces 102.3, 108.7 being intended to come into contact with each other. The inner surface 112.14 of the first tubular portion 112.6 of the first part 112.2 of the female connector 112, being intended to come into contact with the outer surface 112.18 of the tubular portion 112.8 of the female connector 112. The inner 112.16 and outer 112.18 surfaces of the annular portion 112.12 of the second part 112.8 of the female connector 112 are fixed to the outer envelope 104. The inner surface 112.16 of the tubular portion 112.8 of the female connector 112, being intended to come into contact with the outer surface 108.13 of the tubular portion 108.11 of the male connector 108.

By way of example, these surfaces 102.3, 108.7, 108.13, 112.14, 112.16, 112.18 are coated with a deposit limiting friction and wear, for example the deposit is a layer of cermet $Cr_3C_2$—NiCr, or yttrium stabilised zirconia.

The jacket 102 advantageously comprises holes 122.1, 122.2 spread out along the jacket along the X axis, and advantageously spread out in several planes orthogonal to the X axis. For example, the jacket 102 comprises two series 122.1, 122.2 of four holes spread out in two parallel planes, situated respectively at ⅓ and ⅔ of the length of the jacket. These holes 122.1, 122.2 are advantageously spread out regularly in an angular manner. These holes 122.1, 122.2 facilitate the flow of the gas in the case of rapid depressurisation of the pipe.

Between the jacket 102 and the outer envelope 104 is arranged at least one tube formed of a screen assembled in a manner concentric to the jacket.

In one embodiment, two first tubes (not represented) of larger mesh size coarser screen (10 mm mesh and wire diameter of 2 mm) are mounted in a staggered arrangement against the jacket 102. These tubes enable a pressure balancing of the jacket 102 to be achieved. Indeed, during the flow of the fluid, a loading of the jacket 102 caused by pressure drops can take place, which it is preferable to reduce. Furthermore, in an accidental situation, in which a rapid depressurisation of the pipe can occur, these screened tubes facilitate the flow of the gas.

Advantageously, these first tubes are not fixed to the jacket 102 so as to avoid over-stresses due to the differential expansions. The screened tubes are thus free and axially come up against the male connector 108 and the female connector 112.

A second tube, not represented, having a smaller mesh size (flat mesh of 0.5 mm and diameter of wire 0.3 mm) is positioned against the insulation. Advantageously, this third tube is not fixed to the insulation. The purpose of this screen is to prevent the loss of the insulation via the holes 122.1, 122.2 of the jacket 102.

The first and second screened tubes are formed for example from the same material as that used to form the jacket, for example a HR230 or Inconel 600® type nickel alloy.

The thermal insulation material arranged in the element has a low thermal conductivity, advantageously less than 0.3 w/m/° C. It may be for example an alkaline earth silicate felt or wool, i.e. SUPERWOOL® 607 or 612. A graphite felt, such as SIGRATHERM®, may also be envisaged, limited however to oxygen free atmospheres.

Numerical simulations tests were carried out; these tests show that a low level of stress is generated in the outer envelope of the fluid transport pipe according to the present invention. A slight deformation of the jacket 102 is also observed.

Tests were simulated on an element according to the present invention with an inner diameter equal to 200 mm, an outer diameter equal to 388 mm and a length of the outer envelope equal to 1015 mm.

During the numerical simulations, the effect of thermal conduction inside the insulation was disregarded compared to the effect of thermal conduction in the jacket and the metal structures.

To simulate the thermal stresses applied to the pipe, a thermal mapping of the jacket was established. To do this, a uniform contact was modelled between the jackets of the different elements. The external temperature considered corresponds to that obtained by considering a thickness of single insulation, i.e. 200° C. The internal temperature used is that of the fluid, i.e. 1000° C.

The elements used are hexahedrons. The meshes have a size of around 1 mm×2 mm×0.6 mm. The behaviour of the structure is assumed to be axisymmetric.

In FIG. 7 is represented a connection between two elements according to the present invention, in which the temperature obtained by the numerical simulation of the different zones is indicated. The temperature of zone A is imposed as well as the outer exchange conditions by natural air convection of the structure; they are respectively 1000° C. and 20° C. Zone B is at a temperature of 700° C., zone C is at a temperature of 450° C. and zone D is at a temperature of 200° C.

For the mechanical stresses, contact elements enabling the sliding and the non penetration between the two rubbing surfaces were modelled.

As input data from the mechanical calculation, the results of the thermal simulation were used to impose the temperatures of each node as load, to calculate the expansions of the jacket. A pressure of 100 bars was applied to the internal part of the outer envelope. It is considered that the longitudinal end of the pipe is immobilised along the X axis.

It may be observed that the simulation shows a sliding of the jackets of the different elements.

Figure 8:
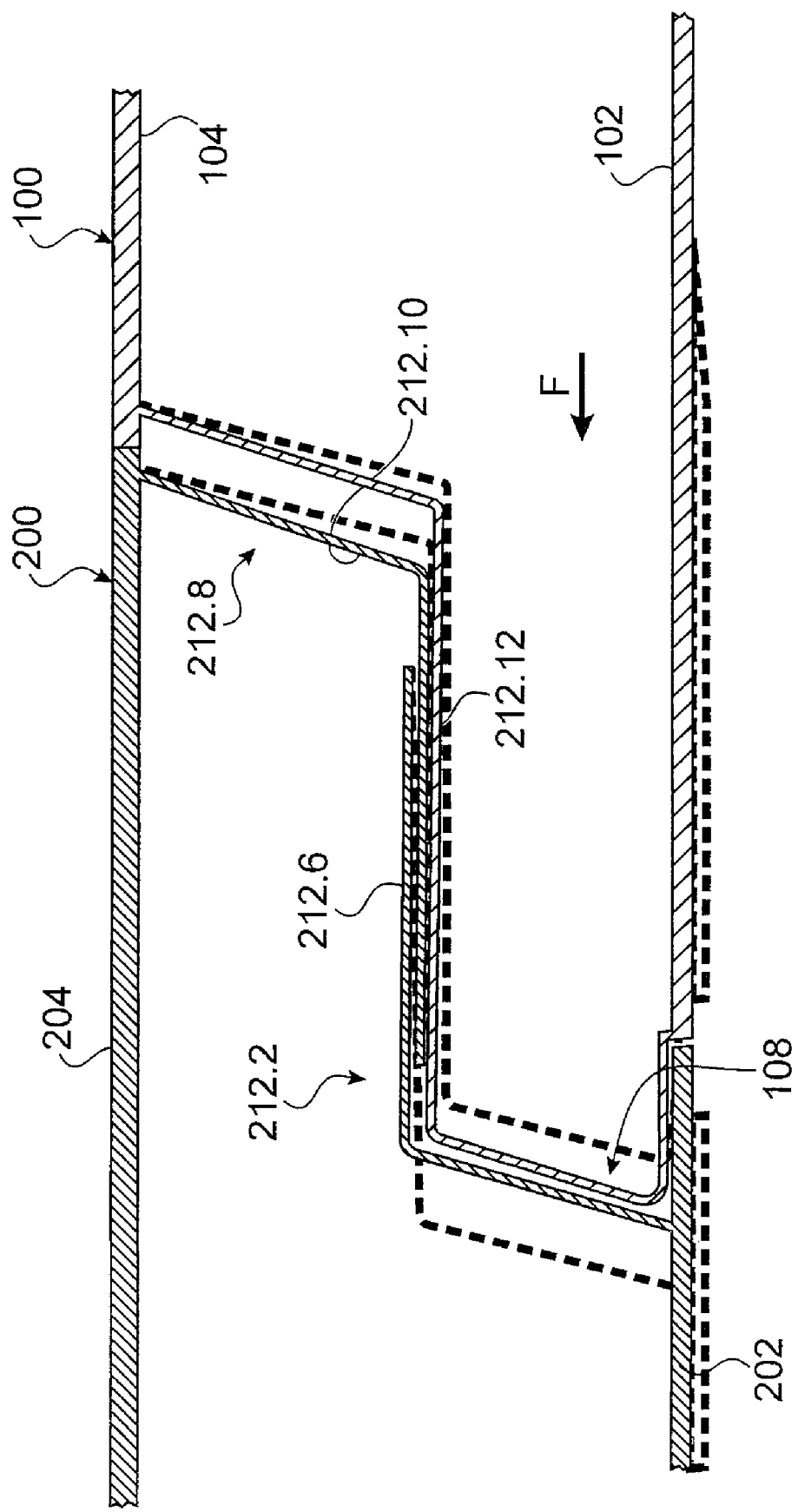
FIG. 8 represents the simulated deformation of a pipe according to the present invention.

In FIG. 8 is represented the simulated deformation of the pipe according to the present invention under the above mentioned conditions.

The elements shown in interrupted lines represent the second part of the female connector and the second flange of the male connector in a non solicited position.

A deformation of the flange 212.10 of the second part 212.8 of the female connector 212 of the downstream element 200 in the direction of the arrow F may be observed, the tubular portion 212.12 of the second part 212.8 has slid in relation to the tubular portion 212.6 of the first part 212.2.

A deformation in the direction of the arrow F of the outer annular flange 108.8 of the male connector 108 of the upstream element 100 may also be observed. The male connector 108 of the upstream element 100 has then slid in relation to the female connector 212 of the downstream element 200. The deformation of the male connector 108 is in the direction of the arrow F and the deformation of the female connector 212 takes place in the direction opposite to the arrow F.

It may then be observed that the sliding of the jackets makes it possible to considerably limit the mechanical stresses of thermal origin due to the expansions, and the mechanical stresses then developing in the metallic structure are acceptable, since a stress of 135 MPa at 500° C. is measured, whereas the limit provided for by the dimensioning codes is around 150 MPa.

The method for fabricating an element according to the present invention will now be described.

The method for fabricating an element according to the present invention comprises the steps:

a) of fabricating a sub-assembly comprising the jacket 102, the male connector 108, and the first part 112.2 of the female connector 112 and fabricating the second part 112.8 of the female connector 112, b) mounting screened tubes on the jacket 102 of the sub-assembly 102, 108 and 112.2, c) fixing the sub-assembly 102, 108 and 112.2 to the outer envelope 104, d) mounting the thermal insulation material between the outer envelope and the jacket, e) fixing the second part 112.8 of the female connector on the outer envelope 104.

The steps of the method for fabricating an element according to the invention will now be detailed.

The fabrication of the element according to the present invention is carried out preferably by sheet metal work.

During step a), the jacket 102 is fabricated preferably from a tube. Rolling and welding a metal sheet may also be envisaged.

Then the holes 122.1, 122.2 are formed in the jacket at the determined positions.

The different parts of the male connector are produced by forming, then welded together.

The male connector is fixed to the jacket by welding.

Advantageously, the parts of the male connector intended to come into contact with the female connector are coated, as has been described previously in relation to FIGS. 3A to 5.

The method according to the invention further comprises a step of mounting screen tubes free to move axially.

The fabrication of the female connector is carried out by forming pieces of the first and second parts and by welding each of these pieces to form the first and second parts.

Advantageously, a step of coating certain surfaces is provided for, as has been described previously.

The first part of the connector is fixed to the jacket 102 at the level of its second longitudinal end 102.2.

The first part of the female connector 112 is fixed by welding on the jacket 102.

During step c), the male connector is then assembled by welding with the outer envelope. An annular housing extending along the X axis and open at one of its longitudinal ends is then obtained.

At step d), the thermal insulation material is then mounted between the jacket and the outer envelope.

At step e), the second part is fixed to the inner face of the outer envelope 104 by welding.

The method for fabricating the pipe according to the present invention comprises the steps:

f) inserting a male connector of a first element into a female connector of a second element, g) securing the two elements by flanging or welding, h) repeating steps f) and g) until a pipe of desired dimension is obtained.

During step f), the male connector 108 of the first element penetrates into the female connector 212 of the second element, the first tubular portion slides around the second longitudinal end 102.2 of the jacket, the second tubular portion slides in the second part of the female connector.

Advantageously, the axial assembly play between the male connector and the female connector is from 0.5 mm to 1 mm diameter depending on the diameter of the pipe.

According to the present invention, the method for fabricating pipes for transporting fluids, in particular hot gases, is simple. The fabrication is carried out by fitting and flanging and/or welding, no added piece apart from the flanging means, if necessary, being added. In addition, the thermal insulation material is confined and therefore does not hinder the fabrication of the pipe.

The invention claimed is:

1. A thermal insulation element for use in a pipe arrangement for transporting gases at high temperature comprising: an outer envelope of longitudinal axis, at least one fibrous type thermal insulation arranged in said envelope with said thermal insulation being encapsulated in the envelope, an inner jacket concentric with the outer envelope and intended to be in contact with the fluid to be transported, said outer envelope and said inner jacket having a first longitudinal end and a second longitudinal end opposite to the first longitudinal end, a male connector adapted to be connected to both the outer envelope and to the jacket at one longitudinal end thereof, a female connector adapted to be connected to both the outer envelope and to the jacket at the opposite longitudinal end, and with said female connector having portions which form an axially adaptable annular zone situated at the level of the female connector comprising a first and a second cylindrical surface that overlap and are able to slide against each other in the case of expansions of said pipe insulation element.

2. Thermal insulation element according to claim 1, in which the male connector comprises a first and a second annular flange connected by a tubular portion, said first flange being fixed to a first longitudinal end of the jacket by means of a tubular portion, and said second flange being fixed to a first longitudinal end of the outer envelope, and the first and second cylindrical surfaces of the female connector forming respectively part of a first part and a second part, said first part being fixed to the jacket and said second part being fixed to the outer envelope.

3. Thermal insulation element according to claim 2, in which the first part comprises an annular flange connected by its inner diameter to the jacket at the level of a second longitudinal end of said jacket and to a first tubular portion by its outer diameter, said first tubular portion forming the first surface, in which the second part comprises an annular flange connected by its outer diameter to a second longitudinal end of the outer envelope and to a second tubular portion by its inner diameter, said second tubular portion forming the second surface, said first and second parts being assembled so that the first and second tubular portions overlap at least partially and can slide against each other.

4. Thermal insulation element according to claim 3, in which the second tubular portion of the second part of the female connector penetrates into the first tubular portion of the first part of the female connector.

5. Thermal insulation element according to claim 3, in which the flange of the first part of the female connector is fixed to the peripheral wall of the jacket behind the second longitudinal end of the jacket.

6. Element according to claim 3, in which the first longitudinal end of the jacket has a splayed shape.

7. Thermal insulation element according to claim 3, in which the flanges comprise a conic shape oriented from the second towards the first longitudinal end of the jacket.

8. Thermal insulation element according to claim 2, in which the male connector is fixed by welding on the outer envelope and the jacket, and the first and second parts of the female connector are fixed by welding on the jacket and the outer envelope (104) respectively.

9. Thermal insulation element according to 30 claim 2, in which the male and female connectors are coated at least partially with a coating capable of reducing friction and wear between the male connector and the female connector, and between the first part of the female connector and the second part of the female connector of the cermet $Cr_3C_2$—NiCr or yttrium stabilized zirconia type.

10. Thermal insulation element according to claim 1 comprising means of fixation to another thermal insulation element according to any of the previous claims, by flanging or by welding.

11. Thermal insulation element according to claim 1, fabricated with a HR230 or Inconel 600 type nickel alloy.

12. Thermal insulation element according to claim 1, in which the thermal insulation has a thermal conductivity less than 0.3.

13. Thermal insulation element according to claim 1, in which the thermal insulation comprises an alkaline earth silicate felt and/or wool, and/or a graphite felt and at least one screened tube.

14. Thermal insulation element according to claim 13, in which the thermal insulation comprises first tubes of larger mesh size screen and a second tube of smaller mesh size screen.

15. Thermal insulation element according to the claim 14, in which the first screened tubes are axially free and in which the axial movement is limited by the male connector and the female connector.

16. Thermal insulation element according to claim 14, in which the first tubes have meshes of 10 mm sides formed with a wire of 2 mm diameter and the second tube has meshes of 0.5 mm sides formed with a wire of 0.3 mm diameter.

17. Fluid transport pipe comprising a succession of thermal insulation elements with each element comprising: an outer envelope of longitudinal axis, at least one fibrous type thermal insulation arranged in said envelope, said thermal insulation being encapsulated in the envelope, an inner jacket concentric with the outer envelope and intended to be in contact with the fluid to be transported; with the outer envelope and inner jacket having a first longitudinal end, and a second longitudinal end opposite to the first longitudinal end, a male connector adapted to be connected to both the outer envelope and to the jacket at one longitudinal end thereof, a female connector adapted to be connected to both the outer envelope and to the jacket at the opposite longitudinal end, and with said female connector having portions which form an axially adaptable annular zone situated at the level of the female connector comprising a first and a second cylindrical surface that overlap and are able to slide against each other in the case of expansions of said pipe insulation element.

* * * * *